(12) United States Patent
Oberender et al.

(10) Patent No.: US 10,463,159 B2
(45) Date of Patent: Nov. 5, 2019

(54) SWIVELING ARRANGEMENT

(71) Applicants: Mike Oberender, Nickenich (DE); Walter Schmitt, Rüber (DE)

(72) Inventors: Mike Oberender, Nickenich (DE); Walter Schmitt, Rüber (DE)

(73) Assignee: Stabilus GmbH, Koblenz (DE)

( * ) Notice: Subject to any disclaimer, the term of this patent is extended or adjusted under 35 U.S.C. 154(b) by 695 days.

(21) Appl. No.: 15/135,082

(22) Filed: Apr. 21, 2016

(65) Prior Publication Data

US 2016/0309904 A1      Oct. 27, 2016

(30) Foreign Application Priority Data

Apr. 22, 2015   (DE) .................. 10 2015 106 134

(51) Int. Cl.
| | |
|---|---|
| *F16F 9/02* | (2006.01) |
| *F16F 9/58* | (2006.01) |

(Continued)

(52) U.S. Cl.
CPC ............ *A47C 17/40* (2013.01); *F16F 9/0218* (2013.01); *F16F 9/516* (2013.01); *F16F 9/58* (2013.01); *F16F 9/585* (2013.01)

(58) Field of Classification Search
CPC .......... F16F 9/516; F16F 9/5165; F16F 9/585; F16F 9/58; F16F 9/0218; F16F 9/0227;

(Continued)

(56) References Cited

U.S. PATENT DOCUMENTS

| | | | |
|---|---|---|---|
| 3,444,830 A | * | 5/1969 | Doetsch ................ A47B 27/06 108/136 |
| 3,603,578 A | | 9/1971 | Herrera |

(Continued)

FOREIGN PATENT DOCUMENTS

| | | |
|---|---|---|
| CH | 473558 | 6/1969 |
| CN | 202445580 | 9/2012 |

(Continued)

OTHER PUBLICATIONS

Office Action dated Dec. 20, 2017 which issued in the corresponding Chinese Patent Application No. 201610228917.6.

(Continued)

*Primary Examiner* — Robert A. Siconolfi
*Assistant Examiner* — San M Aung
(74) *Attorney, Agent, or Firm* — Cozen O'Connor

(57) ABSTRACT

A swiveling arrangement with a swiveling element swivelable around an axis powered and damped by a gas spring having a cylinder filled with gas and divided into first and second working chambers by a piston that has a piston rod guided through the second working chamber and a guiding and sealing unit. A first connection opened during an outward stroke of the piston from the second to the first working chamber, and a second connection is opened during an inward stroke from the first to the second working chamber that has a smaller cross-sectional flow area than the first connection. An auxiliary piston separates the second working chamber from an auxiliary chamber. A third connection from the auxiliary chamber to the second working chamber opened in the end move-out stroke and a fourth connection from the second working chamber to the auxiliary chamber opened in the move-in stroke.

13 Claims, 2 Drawing Sheets

(51) Int. Cl.
*A47C 17/40* (2006.01)
*F16F 9/516* (2006.01)

(58) Field of Classification Search
CPC .. F16F 9/49; F16F 9/483; F16F 9/3415; F16F 9/512; F16F 9/19; E05F 3/00; E05F 5/006; A47B 96/00; E05Y 2900/546; E05Y 2201/21; E05Y 2201/254; E05Y 2201/264
USPC ....... 267/64.11, 64.12, 70, 71, 34, 120, 126, 267/127, 124, 226; 188/282.5, 282.6, 188/282.1, 280, 282.8, 283, 284, 313, 188/316, 317, 322.15, 322.17; 296/56, 296/146; 160/188; 277/583; 92/168
See application file for complete search history.

(56) References Cited

U.S. PATENT DOCUMENTS

| | | | | |
|---|---|---|---|---|
| 3,947,006 | A * | 3/1976 | Bauer | F16F 9/0254 |
| | | | | 267/120 |
| 3,963,227 | A * | 6/1976 | Molders | F16F 9/0218 |
| | | | | 267/120 |
| 4,736,824 | A * | 4/1988 | Dony | F16F 9/0245 |
| | | | | 188/322.17 |
| 4,796,871 | A * | 1/1989 | Bauer | F16F 9/49 |
| | | | | 188/282.1 |
| 5,978,988 | A | 11/1999 | Burchett | |
| 6,441,630 | B1 * | 8/2002 | Obikane | G01R 31/2887 |
| | | | | 267/64.11 |
| 8,127,901 | B1 | 3/2012 | Lu | |
| 10,094,157 | B2 * | 10/2018 | Pyo | F16F 9/3415 |
| 2004/0040213 | A1 * | 3/2004 | McCarthy-Garland | E05F 1/1091 |
| | | | | 49/341 |
| 2006/0027955 | A1 * | 2/2006 | Adoline | F16F 1/128 |
| | | | | 267/64.12 |
| 2009/0120003 | A1 * | 5/2009 | Bochen | B60J 5/102 |
| | | | | 49/340 |
| 2009/0178984 | A1 * | 7/2009 | Ouyang | B62H 3/12 |
| | | | | 211/18 |
| 2013/0145548 | A1 * | 6/2013 | Grone | A47C 17/48 |
| | | | | 5/136 |
| 2014/0310873 | A1 * | 10/2014 | Gosling | A47B 5/04 |
| | | | | 5/136 |

FOREIGN PATENT DOCUMENTS

| | | |
|---|---|---|
| DE | 40 00 865 | 7/1991 |
| DE | 10 2005 044 578 | 5/2007 |
| WO | WO 2013101298 | 7/2013 |

OTHER PUBLICATIONS

Search Report dated Sep. 13, 2016 which issued in the corresponding European Patent Application No. 16163711.1.

* cited by examiner

SWIVELING ARRANGEMENT

BACKGROUND OF THE INVENTION

1. Field of the Invention

The invention is directed to a swiveling arrangement with a swiveling element swivelable around a swivel axis arranged at one end region of the swiveling element between a vertically upwardly directed inoperative position and a horizontally directed operative position, wherein the swiveling movement of the swiveling element is powered by, and can be damped by, a gas spring.

2. Description of the Related Art

In a known swiveling arrangement of the type mentioned above, the swiveling element is a swiveling bed that can be folded out of its upwardly directed inoperative position into a horizontally directed rest position and folded into its inoperative position from its sleeping position. Two gas springs running in opposite directions are provided so that gentle damping is carried out when folding out and folding in.

This swiveling arrangement has a complicated construction and requires a large installation space.

SUMMARY OF THE INVENTION

An object of one embodiment of the invention to provide a swiveling arrangement of the type mentioned above constructed in a simple manner and requires little installation space.

According to one aspect of the invention the gas spring moved out in the inoperative position and moved in in the operative position has a cylinder filled with gas under pressure, the interior of the cylinder being divided into a first working chamber and a second working chamber by a displaceable piston, the piston has a piston rod on the one side, which piston rod is guided outward in a sealed manner through the second working chamber and a guiding and sealing unit, with a first connection opened during an outward stroke of the piston and which leads from the second working chamber to the first working chamber, and a second connection opened during an inward stroke of the piston and which leads from the first working chamber to the second working chamber and which has a smaller cross-sectional flow area than the cross-sectional flow area of the first connection, with an auxiliary piston arranged in the cylinder and displaceably arranged on the piston rod and which separates the second working chamber on the side thereof remote of the piston from an auxiliary chamber formed in the cylinder, with a third connection from the auxiliary chamber to the second working chamber opened in the end move-out stroke region of the piston, and a fourth connection from the second working chamber to the auxiliary chamber opened in the move-in stroke of the piston. The cross-sectional flow area of the third connection is smaller than the cross-sectional flow area of the fourth connection.

When this swiveling arrangement according to one aspect of the invention is swiveled out of its upwardly directed inoperative position into its horizontal operative position, the piston rod moves with the piston into the cylinder. Only the second connection leading from the first working chamber to the second working chamber is opened. Due to its smaller cross-sectional flow area, this swiveling movement takes place in a damped manner. In this regard, the pressure in the first working chamber is also increased, which forms an additional resistance precisely on the second half of the swiveling path. Accordingly, the swiveling element comes into its operative position in a gently damped manner.

During a swiveling out of the operative position into the inoperative position, only the first connection leading from the second working chamber to the first working chamber is opened. Since the first connection has a larger cross-sectional flow area than the second connection, this swiveling movement is carried out with less damping than in the opposite direction or even substantially without damping when the cross-sectional flow area of the first connection is correspondingly large.

Accordingly, the outward movement takes place with only slight damping or substantially without damping until the auxiliary piston and, therefore, the end move-out stroke is reached. The swiveling movement of the swiveling element initiated by an external force, e.g., manual force, acting on the swiveling element takes place with at least extensive assistance of the gas spring.

When the piston makes contact with the auxiliary piston during this swiveling movement, the auxiliary piston must be displaced along with the piston in the end move-out stroke until the piston and piston rod are in their fully moved-out position and the pressurized gas present in the auxiliary chamber must flow via the third connection to the second working chamber. However, this takes place in a damped manner because the cross-sectional flow area of the third connection is smaller. Accordingly, the outward movement of the piston rod and piston takes place in a gently damped manner in the end move-out stroke, and a hard impact in the inoperative position is avoided.

As a result of the swiveling arrangement according to one aspect of the invention, different damping is achieved in particular stroke regions of the move-in stroke and move-out stroke with an individual gas spring, which leads to a simple construction and a low installation space requirement.

A low installation space requirement also results when the gas spring extends in, or parallel to, the swiveling plane of the swiveling element and is articulated at the swiveling element by its one end at a stationary first bearing and by its other end at a second bearing, wherein the swiveling element forms a two-armed lever, the first lever arm has a greater extension and forms a function element and the second lever arm forms an articulated element at which the second bearing is arranged at a distance from the swivel axis.

The piston rod can be articulated at the first bearing and the cylinder can be articulated at the second bearing or vice versa.

The installation space requirement is especially low when the stationary first bearing is arranged above the swivel axis at a distance from the inoperative position of the swiveling element on the side remote of the swiveling region of the swiveling element.

To move the auxiliary piston toward the second working chamber by the end move-out stroke when the piston rod and piston move in from their fully moved out position, the auxiliary piston can be acted upon by a restoring force to move into an end move-out stroke region position remote of the guiding and sealing unit.

In a simple construction, a helical compression spring surrounds the piston rod at a radial distance is preferably arranged in the auxiliary chamber, this helical compression spring is supported by its one end at the guiding and sealing unit or at a stop fixed to the cylinder in the vicinity of the guiding and sealing unit and which presses the auxiliary piston into the end move-out stroke region position by its other end. The helical compression spring has only a small force sufficient for displacing the auxiliary piston.

An integrated construction that economizes on installation space is achieved in that the first connection and/or the second connection are/is arranged in the piston.

In a simple construction having a low installation space requirement, the piston can have a radially circumferential annular groove in which is arranged a sealing ring with a smaller axial extension than the axial width of the annular groove, the radially outer lateral surface of which sealing ring tightly contacts the inner wall of the cylinder, wherein an annular gap is formed between its radially inner lateral surface and the base of the annular groove, which annular gap is permanently connected to the first working chamber, with one or more restriction grooves formed in the side wall of the annular groove closer to the second working chamber, are open toward the annular groove and have groove apertures that can be covered by the sealing ring or by an annular disk connected to the sealing ring.

During an outward movement, the sealing ring is displaced so as to contact the closer side wall of the annular groove with respect to the first working chamber. Since the annular gap is permanently connected to the first working chamber and the sealing ring or annular disk connected to the sealing ring is lifted from the side wall closer to the second working chamber, the first connection is accordingly formed with a larger cross-sectional flow area.

During the inward movement, the sealing ring or annular disk connected to the sealing ring contacts the side wall closer to the second working chamber so that the annular gap which is permanently connected to the first working chamber is connected to the second working chamber only via the restriction grooves having a smaller cross-sectional flow area. Accordingly, the second connection is formed with a smaller cross-sectional flow area.

A simple construction with a low installation space requirement again results when the third connection and/or the fourth connection are/is arranged in the auxiliary piston.

The auxiliary piston can be guided in the cylinder in a sealed manner and can have a guide bore passing coaxially therethrough, by means of which guide bore the auxiliary piston is displaceably guided on the piston rod, and the third connection is formed by an annular gap between the piston rod and the guide bore.

In this regard, one or more further restriction grooves are formed so as to pass through radially in the front side of the auxiliary piston facing the second working chamber, and the groove apertures of the restriction grooves facing the second working chamber can be covered by the piston when the piston contacts the auxiliary piston, wherein the second working chamber can be connected to the radially outer ends of the further restriction grooves.

To prevent flow around the auxiliary piston between the second working chamber and the auxiliary chamber, the auxiliary piston can have at its radially circumferential lateral surface a radially circumferential seal groove in which is arranged a second sealing ring contacting the inner wall of the cylinder.

The swiveling element is preferably a swiveling bed that can be swiveled into a vertically upwardly directed inoperative position, particularly in a closet-like carcass, when not in use. In order to use, it is swiveled into a horizontally directed operative position.

Swiveling into the operative position is initiated by an application of manual force to the swiveling bed that then swivels farther into its operative position independently due to its own weight, and this swiveling movement is damped by the gas spring so that the swiveling bed does not strike the floor when the operative position is reached but settles down on it gently.

Swiveling out of the inoperative position into the operative position is also carried out through manual force assisted through the gas spring. In the final portion of the swiveling movement, this takes place so as to be damped through the gas spring so that the swiveling bed reaches the inoperative position in a gently damped manner and does not bang into the closet-like carcass.

Other objects and features of the present invention will become apparent from he following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment example of the invention is shown in the drawing and described more fully in the following: The drawings show.

DETAILED DESCRIPTION OF THE PRESENTLY PREFERRED EMBODIMENTS

Figure 1:
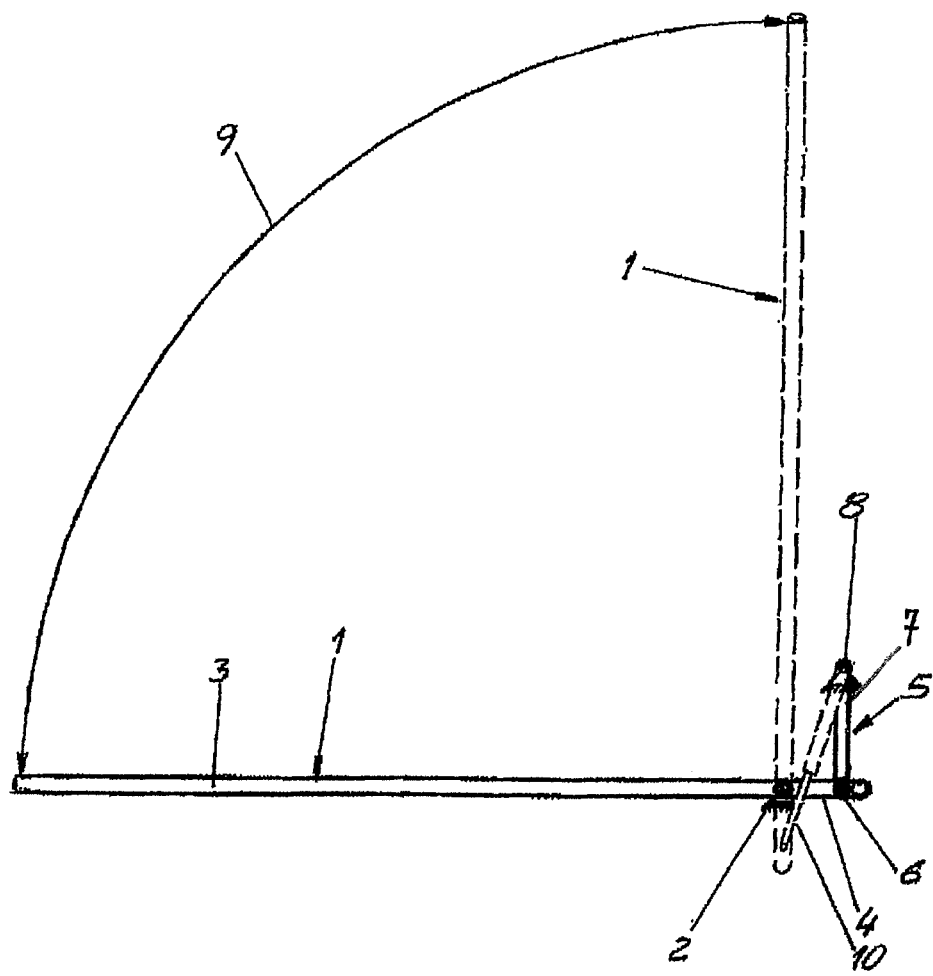
FIG. 1 is a schematic side view of a swiveling arrangement in inoperative position and operative position.

The swiveling arrangement shown in FIG. 1 is indicated by a solid line in a horizontal operative position and by a dotted line in the vertically upwardly directed inoperative position and has a swiveling element 1 formed as a two-armed lever mounted so as to be swivelable around a fixed swivel axis 2. The swiveling element is formed of a first lever arm 3 having a greater extension and a second lever arm 4 having a smaller extension. A gas spring 5 is arranged parallel to the swivel plane of the swiveling element 1, the free end of the piston rod 10 of the gas spring 5 being articulated at a second bearing 6 at the second lever arm 4 at a distance from the swivel axis 2. The end of the cylinder 7 of the gas spring 5 opposite the piston rod 10 is articulated at a stationary bearing 8 which is located above the swivel axis 2 and at a distance from the inoperative position of the swiveling element 1 on the side remote of the swiveling region 9. This distance corresponds approximately to the distance of the second bearing from the swivel axis so that the gas spring 5 is oriented approximately perpendicularly in the operative position of the swiveling element 1.

In the inoperative position of the swiveling element 1, the piston rod 10 is moved out of the cylinder 7 and is moved into the operative position.

Figure 2:
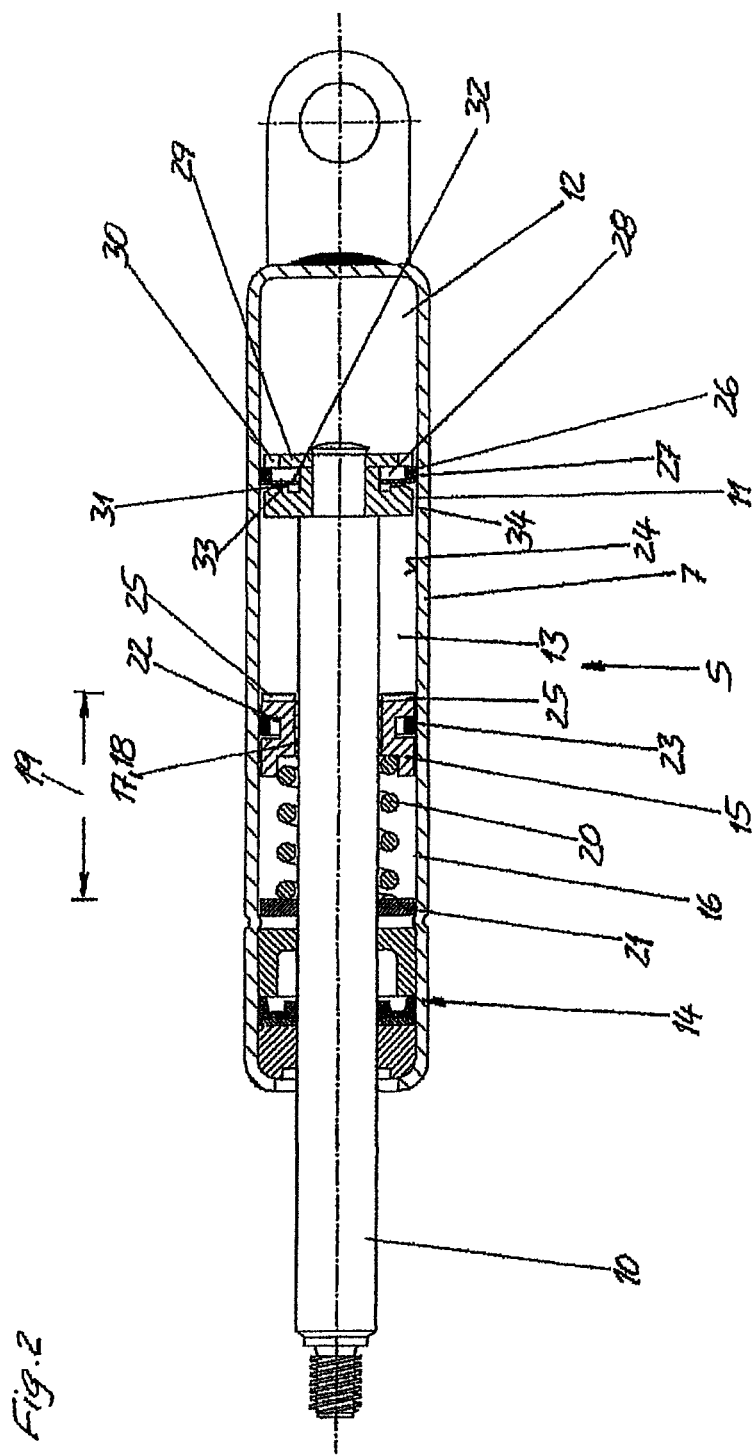
FIG. 2 is a longitudinal section through a gas spring of the swiveling element from FIG. 1.

With respect to the gas spring 5 which is shown in more detail in FIG. 2, a piston 11 is arranged so as to be axially displaceable in the cylinder 7 which is filled with a pressurized gas, the end of the piston rod 10 projecting into the cylinder 7 being fixedly arranged at piston 11. The piston 11 divides the interior of the cylinder 7 into a first working chamber 12 remote of the piston rod 10 and a second working chamber 13 on the piston rod side. The piston rod 10 is guided out in a sealed manner through the second working chamber 13 and a guiding and sealing unit 14.

An auxiliary piston 15 is displaceably arranged in the cylinder 7 and separates the second working chamber 13 on its side remote of the piston from an auxiliary chamber 16 formed in the cylinder 7.

The auxiliary piston 15 has a guide bore 17 passing coaxially therethrough, the piston rod 10 being guided through this guide bore 17. An annular gap 18 is formed between the piston rod 10 and the guide bore 17. The two sides of the auxiliary piston 15 communicate with one another via the annular gap 18.

In FIG. 1, the front side of the auxiliary piston 15 facing the second working chamber 13 is at a distance from the region of the guiding and sealing unit 14 equal to an end move-out stroke region 19, and the auxiliary piston 15 is acted upon in this position by the one end of a helical compression spring 20. The helical compression spring 20 surrounds the piston rod 10 in the auxiliary chamber 16 at a radial distance and is supported by its other end at a supporting disk 21 fixedly arranged in the cylinder 7 at the end of the auxiliary chamber 16 remote of the piston 11.

At its radially circumferential lateral surface, the auxiliary piston 15 has a radially circumferential seal groove 22 in which is arranged a second sealing ring 23 that prevents a connection of the two axial sides of the auxiliary piston 15 between the auxiliary piston 15 and the inner wall 24 of the cylinder 7.

On its front side facing the piston 11, the auxiliary piston 15 has second restriction grooves 25 passing radially therethrough, these second restriction grooves 25 having an overall cross-sectional flow area that is smaller than the cross-sectional flow area of the annular gap 18.

At its radially circumferential lateral surface, the piston 11 has a radially circumferential annular groove 26 in which is arranged a first sealing ring 27 having a smaller axial extension than the axial width of the annular groove 26 so that the first sealing ring 27 is movable between the two side walls of the annular groove 26. The first sealing ring 27 tightly contacts the inner wall 24 of the cylinder 7 by its radially circumferential outer lateral surface.

A second annular gap 28 is formed between the radially inner lateral surface of the first sealing ring 27 and the base of the annular groove 26. The side wall of the annular groove 26 facing the first working chamber 12 is formed by a star disk 29, the ray gaps 30 of which star disk 29 permanently connect the second annular gap 28 with large cross section to the first working chamber 12.

Radial first restriction grooves 31, which open toward the annular groove 26, are formed in the side wall 33 of the annular groove 26 closer to the second working chamber 13. An annular disk 32 is arranged at the first sealing ring 27 at the side of the first sealing ring 27 facing the second working chamber 13, and the apertures of the restriction grooves 31 directed toward the annular groove 26 are covered by this annular disk 32 when the first sealing ring 27 is located in its position closer to the second working chamber 13. In this position, the second annular gap 28 in the annular groove 26 is connected radially outwardly to a third annular gap 34 between the outer lateral surface of the piston and the inner wall 24 of the cylinder 7 and, therefore, to the second working chamber 13 only via the first restriction grooves 31 having a smaller cross-sectional flow area.

When the first sealing ring 27 contacts the star disk 29, the annular disk 32 is also lifted from the side wall 33 so that there is a large cross-sectional flow area between the annular disk 32 and the side wall 33 from the second annular gap 28 in the annular groove 26 to the third annular gap 34 and the second working chamber 13.

During the inward movement of the piston rod 10 and piston 11, the annular disk 32 connected to the first sealing ring 27 contacts the side wall 33 closer to the second working chamber 13 so that the second annular gap 28, which is permanently connected to the first working chamber 12, is connected to the second working chamber 13 only via the first restriction grooves 31 having a smaller cross-sectional flow area. Accordingly, a second connection leading from the first working chamber 12 to the second working chamber 13 is formed and has a smaller cross-sectional flow area, so that the movement of the swiveling element 1 out of its vertical position into its horizontal position is damped. The piston 11 lifts from the auxiliary piston 15 at the start of the inward movement so that pressurized gas can flow substantially without damping through the annular gap 18 forming a third connection from the auxiliary chamber 16 to the second working chamber 13. The auxiliary piston 15 is moved into its end move-out stroke position through the low-force helical compression spring 20.

During an outward movement, the first sealing ring 27 is displaced for contacting the star disk 29 of the annular groove 26 closer to the first working chamber 12. Since the second annular gap 28 is permanently connected to the first working chamber 12 via the ray gaps 30, and the annular disk 32 connected to the sealing ring 27 is lifted from the side wall 33 closer to the second working chamber 13, a first connection with larger cross-sectional flow area is formed so that a swiveling movement of the swiveling element 1 out of its horizontal position into its vertical position is initially carried out in an at least substantially undamped manner.

Piston 11 makes contact with the front side of the auxiliary piston 15 facing piston 11 so that a fourth connection provides only one possibility for the pressurized gas to flow out of the second working chamber 13 through the second restriction grooves 25 and annular gap 18 to the auxiliary chamber 16. The restriction grooves 31 lead to a damped outward movement in the end move-out stroke region 19 of the piston 11 and piston rod 10.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A swiveling arrangement comprising:
   a swiveling element configured to perform a swiveling movement between a vertically upwardly directed inoperative position and a horizontally directed operative position around a swivel axis arranged at the one end region of the swiveling element;

a gas spring configured to power and damp the swiveling movement of the swiveling element and configured to moved out in the inoperative position and moved in in the operative position, comprising:
  a cylinder filled with gas under pressure;
  a guiding and sealing unit;
  a displaceable piston arranged in an interior of the cylinder and dividing the cylinder into a first working chamber and a second working chamber;
  a piston rod extending from one side of the displaceable piston, the piston rod guided outward in a sealed manner through the second working chamber and the guiding and sealing unit;
  a first connection configured to be opened during an outward stroke of the piston that leads from the second working chamber to the first working chamber;
  a second connection configured to be opened during an inward stroke of the piston that leads from the first working chamber to the second working chamber and which has a smaller cross-sectional flow area than a cross-sectional flow area of the first connection;
  an auxiliary piston arranged in the cylinder and displaceably arranged on the piston rod that separates the second working chamber from an auxiliary chamber formed in the cylinder;
  a third connection from the auxiliary chamber to the second working chamber opened in an end move-out stroke region of the piston;
  a fourth connection from the second working chamber to the auxiliary chamber opened in a move-in stroke of the piston, wherein a cross-sectional flow area of the third connection is smaller than across-sectional flow area of the fourth connection,
  wherein the gas spring extends in, or parallel to, a swiveling plane of the swiveling element and is articulated at the swiveling element by its one end at a stationary first bearing and by its other end at a second bearing, wherein the swiveling element forms a two-armed lever, a first lever arm has a greater extension and forms a function element and a second lever arm forms an articulated element at which the second bearing is arranged at a distance from the swivel axis.

2. The swiveling arrangement according to claim 1, wherein the stationary first bearing is arranged above the swivel axis at a distance from the inoperative position of the swiveling element on a side remote of a swiveling region of the swiveling element.

3. The swiveling arrangement according to claim 1, wherein the auxiliary piston is acted upon by a restoring force in an end move-out stroke region position remote of the guiding and sealing unit.

4. The swiveling arrangement according to claim 3, wherein a helical compression spring that surrounds the piston rod at a radial distance is arranged in the auxiliary chamber, the helical compression spring being supported at a first end at one of the guiding and sealing unit and a stop fixed to the cylinder proximate to the guiding and sealing unit that presses the auxiliary piston into the end move-out stroke region position by its other end.

5. The swiveling arrangement according to claim 1, wherein at least one of the first connection and the second connection is arranged in the piston.

6. A swiveling arrangement comprising:
  a swiveling element configured to perform a swiveling movement between a vertically upwardly directed inoperative position and a horizontally directed operative position around a swivel axis arranged at the one end region of the swiveling element;
  a gas spring configured to power and damp the swiveling movement of the swiveling element and configured to moved out in the inoperative position and moved in in the operative position, comprising:
  a cylinder filled with gas under pressure;
  a guiding and sealing unit;
  a displaceable piston arranged in an interior of the cylinder and dividing the cylinder into a first working chamber and a second working chamber;
  a piston rod extending from one side of the displaceable piston, the piston rod guided outward in a sealed manner through the second working chamber and the guiding and sealing unit;
  a first connection configured to be opened during an outward stroke of the piston that leads from the second working chamber to the first working chamber;
  a second connection configured to be opened during an inward stroke of the piston that leads from the first working chamber to the second working chamber and which has a smaller cross-sectional flow area than a cross-sectional flow area of the first connection;
  an auxiliary piston arranged in the cylinder and displaceably arranged on the piston rod that separates the second working chamber from an auxiliary chamber formed in the cylinder;
  a third connection from the auxiliary chamber to the second working chamber opened in an end move-out stroke region of the piston;
  a fourth connection from the second working chamber to the auxiliary chamber opened in a move-in stroke of the piston, wherein a cross-sectional flow area of the third connection is smaller than across-sectional flow area of the fourth connection,
  wherein at least one of the first connection and the second connection is arranged in the piston,
  wherein the piston has a radially circumferential annular groove in which a sealing ring with a smaller axial extension than an axial width of the annular groove is arranged, a radially outer lateral surface of the sealing ring is configured to tightly contact the inner wall of the cylinder, wherein an annular gap is formed between a radially inner lateral surface of the sealing ring and the base of the annular groove, the annular gap permanently connected to the first working chamber, with one or more restriction grooves formed in a side wall of the annular groove closer to the second working chamber, open toward the annular groove and have groove apertures configured to be covered by one of the sealing ring and an annular disk connected to the sealing ring.

7. The swiveling arrangement according to claim 1, wherein at least one of the third connection and the fourth connection is arranged in the auxiliary piston.

8. A swiveling arrangement comprising:
  a swiveling element configured to perform a swiveling movement between a vertically upwardly directed inoperative position and a horizontally directed operative position around a swivel axis arranged at the one end region of the swiveling element;
  a gas spring configured to power and damp the swiveling movement of the swiveling element and configured to moved out in the inoperative position and moved in in the operative position, comprising:
  a cylinder filled with gas under pressure;
  a guiding and sealing unit;

a displaceable piston arranged in an interior of the cylinder and dividing the cylinder into a first working chamber and a second working chamber;

a piston rod extending from one side of the displaceable piston, the piston rod guided outward in a sealed manner through the second working chamber and the guiding and sealing unit;

a first connection configured to be opened during an outward stroke of the piston that leads from the second working chamber to the first working chamber;

a second connection configured to be opened during an inward stroke of the piston that leads from the first working chamber to the second working chamber and which has a smaller cross-sectional flow area than a cross-sectional flow area of the first connection;

an auxiliary piston arranged in the cylinder and displaceably arranged on the piston rod that separates the second working chamber from an auxiliary chamber formed in the cylinder;

a third connection from the auxiliary chamber to the second working chamber opened in an end move-out stroke region of the piston;

a fourth connection from the second working chamber to the auxiliary chamber opened in a move-in stroke of the piston, wherein a cross-sectional flow area of the third connection is smaller than across-sectional flow area of the fourth connection, wherein at least one of the third connection and the fourth connection is arranged in the auxiliary piston, wherein the auxiliary piston is guided in the cylinder in a sealed manner and has a guide bore passing coaxially therethrough, by which guide bore the auxiliary piston is displaceably guided on the piston rod, wherein the third connection is formed by an annular gap between the piston rod and the guide bore.

9. The swiveling arrangement according to claim 8, wherein one or more further restriction grooves are formed to pass through radially in the front side of the auxiliary piston facing the second working chamber, and groove apertures of the restriction grooves facing the second working chamber configured to be covered by the piston when the piston contacts the auxiliary piston, wherein the second working chamber is configured to be connected to radially outer ends of the further restriction grooves.

10. The swiveling arrangement according to claim 8, wherein the auxiliary piston has at its radially circumferential lateral surface a radially circumferential seal groove in which a second sealing ring contacting the inner wall of the cylinder is arranged.

11. The swiveling arrangement according to claim 1, wherein the swiveling element is a swiveling bed.

12. The swiveling arrangement according to claim 9, wherein the auxiliary piston has at its radially circumferential lateral surface a radially circumferential seal groove in which a second sealing ring contacting the inner wall of the cylinder is arranged.

13. The swiveling arrangement according to claim 11, wherein the swiveling bed is configured to be swiveled into the upwardly directed inoperative position when not in use and swiveled into a horizontally directed operative position when in use.

* * * * *